Sheet 1, 3 Sheets
Johnson & Steuernagel.
Hydrometer
Nº 61,913.                Patented Feb. 5, 1867.
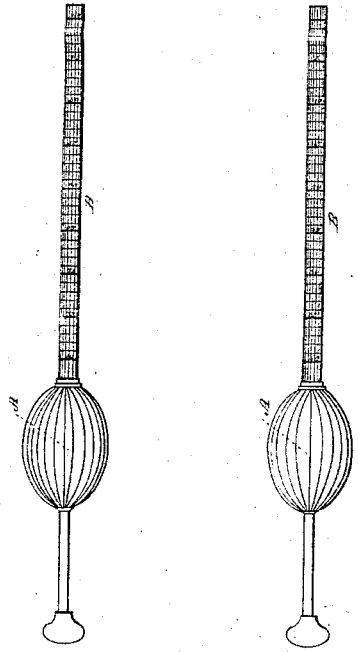
Witnesses.
Marcus P. Norton
John W. Parsons
Inventors
Edmund Johnson
Aug. Steuernagel

*Johnson & Steuernagel.* Sheet 2, 3 Sheets.
*Hydrometer.*

Nº 61,913. Patented Feb. 5, 1867.

Witnesses:
Marcus R. Norton
John W. Parsons

Inventors
Edward Johnson
Aug. Steuernagel

Johnson & Steuernagel.
Hydrometer.
N°. 61,913.    Patented Feb. 5, 1867.

(Continuation of Sheet 1.)

Witnesses.                                   Inventors
                                             Edmund Johnson
                                             Nay Steuernagel

United States Patent Office.

EDMUND JOHNSON AND AUGUST STEUERNAGEL, OF WASHINGTON, DISTRICT OF COLUMBIA, ASSIGNORS TO THEMSELVES, JOHN W. PARSONS, DAVID R. SMITH, D. W. BLISS, AND MARCUS P. NORTON.

*Letters Patent No. 61,913, dated February 5, 1867.*

IMPROVED MODE OF PREVENTING FRAUDS ON THE REVENUE DERIVED FROM SPIRITS AND MALT LIQUORS.

*The Schedule referred to in these Letters Patent and making part of the same.*

TO ALL WHOM IT MAY CONCERN:

Be it known that we, EDMUND JOHNSON and AUGUST STEUERNAGEL, each of the city and county of Washington, and District of Columbia, have jointly invented certain new and useful improvements and invention to prevent frauds in the manufacture of or distillation of whisky, or other or similar liquors, which we hereby denominate a Sacchanometer, with a scale and table plan therewith attached or combined, in the manner and for the purposes substantially as herein described and set forth; and we do hereby declare that the following is a clear and exact description of the said invention and improvements, reference being hereby had to the accompanying drawings, and to the letters and figures of reference and explanation marked thereon, by which the construction, nature, and operation or manner of operating our said invention and improvements are shown.

Hitherto there has been no device or plan to prevent large frauds upon the revenue of the country by manufacturers, distillers of whisky, or other or similar liquors. The Government, in order to ascertain or to know the quantity of liquors of the kind aforesaid manufactured or distilled during each day, or day and night, by any person or company engaged in the manufacture or distillation of whisky or other kinds of liquors, in order to apply thereto the tax in the manner as by law provided, has usually employed one or more persons at each manufactory, known and called a local inspector, who is supposed to attend such works, and to report the number of gallons made to the proper officer, so as to apply to said works or manufactory the proper Government tax. It will be seen that it is a very easy matter for collusion between such inspector and manufacturers; as, for example, the manufacturer makes one thousand gallons of whisky per day, but, by an understanding with the said inspector, he, the inspector, reports to the proper Government officer but five hundred gallons made that day. Here it will be seen that the Government is actually defrauded from the taxation of five hundred gallons of whisky; and so the manufacturer is permitted to make great gains and profits by reason of this fraud practised by him and such inspector upon the Government, as aforesaid, there being nothing to check or prevent such collusion by and between the said distiller and inspector by means of which false returns are made to the Government. It has recently been ascertained that such false and fraudulent returns are now, and have for a long while, been practised and carried to a very great extent, by which the Government has suffered very great losses in the internal revenue department, of or to the amount of hundreds of thousands of dollars annually. To remedy this great evil, and to enable the Government to tax all the whisky or other similar liquors made in this country, and subject to taxation under the law, is the object of our said invention and improvements; and by its use and application to any distillery or manufactory there can never be any collusion or fraud by and between the manufacturers and Government inspectors without being at once detected and discovered. By the use of our said invention every gallon of whisky made will be ascertained and registered, whether made day or night; and it will also detect and report any drawing away of the liquors from the tubs containing the same, and so it will discover, detect, and report any fraudulent means resorted to to make a less number of gallons from the actual number of gallons made during any given time, in spite of any efforts on the part of any inspector or manufacturer to make it otherwise for purposes of defrauding the Government in its internal revenue department.

Sheet 1 of the accompanying drawings represents, or has the general appearance of, similar instruments destined to weigh or ascertain the alcoholic, saccharine, and such like quality of any given liquid. The shape of the same is governed by its destination to be inserted into the liquid, and to be kept in a floating perpendicular position. To accomplish this end it must consist of a tube, on which the scale is marked, a spheroid bulb, to keep it floating, and a weight attached, so as to keep it in balance. The improvement in this instrument claimed by us as a part of our said invention consists in the employment of the scale, sheet 1 of the accompanying drawings, which scale is adapted thereto. The scales now known and used for other purposes, as Baume's, Trallr's, Twaddell's, and others, are based upon the state of expansion of the liquids at a given temperature, (60° F.,) and used for liquors containing alcohol or principles of alcohol. The use of these scales is limited by their relative unreliability, as the principles upon which they are based have no established foundation or facts, but upon mere hypothesis, while the instrument shown in the accompanying drawings, sheet 1, is exclusively employed or used to ascertain the saccharine quality of the mash used in distilleries during and after the process of fermentation, as shown in the application of the same by reference to the annexed drawings. The object or purposes of the same is to determine, by an exact examination of the mash, the quality of spirits that can possibly be produced with the same; that is, from the mash. The scale is independent of and from the temperature, and it will prove with the same accuracy the mash coming from the boiler, after it is cooled, and during the process of fermentation, which heightens the temperature of the same. A series of practical experiments made by us has determined the use and adoption of this scale, which is not based upon hypothetical principles, but which is the result of practical experiments made by us, as aforesaid stated, and by which the accuracy and reliability of the same, when applied to the use and purposes herein described and set forth, as well as shown and described by the accompanying drawings, have been determined; and the said instrument must in all cases be used in connection with the said scale or plan shown and represented by sheet 2 of the accompanying drawings, and which we describe in operation as follows, as its construction will fully appear by reference to said drawings, sheet 2, to wit:

The controlling officer has first to measure the dimensions of the fermentation tubs at columns 2 to 4; then gauge the same as to their capacity, column 6. The cubic contents of the tubs, after measurement, is found by multiplying the height with the width; then multiply the product with 3.14, and reduce the same to cubic inches, and divide by 231, to obtain the number of gallons. The gauging process is to ascertain the actual quantity of mash fitted therein. The quantity of the ingredients used must be carefully noted, as shown in and by columns 7 to 14 of sheet 2 of the accompanying drawings, and the total of the same noted as in columns 15 and 16 of same drawings. The total of the fermenting mash is taken in column 17. After thirty-six or forty-eight hours—under very unfavorable circumstances after seventy-two hours—the mash will be ready for distillation. During this time it will be the duty of the controlling officer to note daily, at certain hours of the day, the saccharine quality of the mash in each tub in use, with the instrument hereinbefore described and set forth, and shown in the accompanying drawings at sheet 1, or by means of some instrument substantially the same in operation, and results attained, when used in connection or combination with the plan set forth in and by sheet 2 of said accompanying drawings, as indicated by columns 18 to 26 thereof. The same will be done when the mash is ready for the still, which will generally be the case when the sacchanometer shows upon the said improved scale 3°, or even less than that. After this the controlling officer will note such remarks in column 30 of said accompanying drawings, sheet 2, as he may deem necessary to bring to the knowledge of the proper officer or Treasury Department of the Government; as, for example, when a tub runs out, or if the mash in one of them becomes unfit for use, or under any other circumstances that would produce an alteration in the result; and finally the said officer will, by his signature in column 31, certify to the correctness of the whole operation and results attained.

The next step taken is to state the kind of the apparatus used, and the capacity of its still used by the manufacturers, as there are several different kinds of apparatus used in the distilleries of the United States, among which may be found one known as "Schwarts," "Pistori," "Bengal," &c. The capacity of the still is always in a certain proportion to the size of the tubs used. A distillery with four fermenting tubs, of, say eighteen hundred gallons capacity each, uses a still of five hundred gallons, or thereabouts. The still being filled with mash, the quantity of which will be noted in the proper place on said sheet 2, the operation begins, and after an hour the produce runs from the worm, which is also noted, and so the process continues on for every hour the distillery is in operation, in the manner and form substantially as indicated and set forth in said sheet 2 of said drawings. In this way the quantity of the spirits made is ascertained, as well as the time when it runs from the worm, and its proof by the said sacchanometer. This operation will be continued until all the tubs are emptied; then the total is taken, and the same process begins again with the newly prepared mash. The report of said operation should be made by the inspector daily, and forwarded to the collector of the district where said distilleries are located, for comparison with the distillers' returns, who will forward it to his superior officer, where the final control will be exercised according to the following table, to wit:

When the sacchanometer shows by the improved scale—

| | Each Bushel of Grain. | Each Gallon of Molasses. |
|---|---|---|
| 3°, the produce in spirits will be | 2½ gallons, | 80 per cent. |
| 2°, " " " | 3 " | 85 " |
| 1°, " " " | 3¼ " | 90 " |
| 0°, " " " | 3½ " | 95 " |

This table is sufficient for the ordinary transactions in the working and management in and of distilleries; and a mash showing more than 3° sacchanometer, new scale aforesaid, will never produce spirits proof or over proof. It will therefore be seen and understood that no fraud can be practised upon the revenue department of the Government by reason of any trading, arrangement, or collusion to defraud, of any kind, by and between the Government inspector and the distiller or whisky manufacturer, without being at once discovered and detected. A report must be made, and it must be truthfully made, or the error or fraud will at the time be found out.

Having thus described our said invention and improvements, what we claim, and desire to secure by Letters Patent, is—

1. The sacchanometer A, containing scale B, when applied to and used in combination with the scale or table of sheet 2 of the drawings, to prevent frauds in the distillation or manufacture of whisky or other similar liquors, in the manner substantially as herein described and set forth.

2. We claim the employment of said scale or table, sheet 2 of said drawing, constructed and operated in the manner and for the purposes substantially as herein described and set forth.

3. We claim the process or means herein described and set forth for detecting and preventing frauds in the distillation of whisky or other or similar liquors by distillers, substantially as herein described and set forth.

In testimony whereof we have, on this 5th day of January, 1867, hereunto set our hands.

EDMUND JOHNSON,
AUG. STEUERNAGEL.

Witnesses:
    DAVID R. SMITH,
    JNO. W. PARSONS.